United States Patent Office 3,786,054
Patented Jan. 15, 1974

3,786,054
3-METHYL-N-METHYLMORPHINANS
Masuo Murakami, Shigemi Kawahara, and Noriyoshi Inukai, Tokyo, Noriaki Nagano and Hidenori Iwamoto, Ageo, and Hisashi Ida, Urawa, Japan, assignors to Yamanouchi Pharmaceutical Co., Ltd.
No Drawing. Filed June 8, 1971, Ser. No. 150,900
Claims priority, application Japan, June 20, 1970, 45/53,918; Feb. 2, 1971, 46/3,945; Feb. 9, 1971, 46/5,413
Int. Cl. C07d 43/32
U.S. Cl. 260—285          6 Claims

ABSTRACT OF THE DISCLOSURE

A novel morphinan derivative represented by the general formula

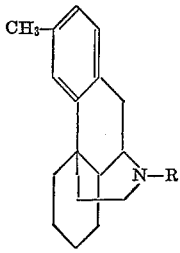

wherein R represents an aliphatic hydrocarbon residual group having 1-5 carbon atoms and an acid-addition salt thereof. These compounds have an excellent antitussive activity.

DETAILED EXPLANATION OF THE INVENTION

The present invention relates to a novel morphinan derivative and a nontoxic acid-addition salt thereof and more particularly, the invention relates to a novel morphinan derivative represented by the general formula

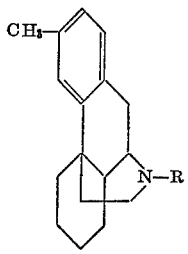

wherein R represents an aliphatic hydrocarbon residual group and a nontoxic acid-addition salt thereof.

As the aliphatic hydrocarbon residual group having 1-5 carbon atoms mentioned above, there are illustrated such straight chain or branched chain groups as a methyl group, an ethyl group, a propyl group, an isopropyl group, a butyl group, an isobutyl group, an allyl group, a t-butyl group, a 2-butenyl group, an amyl group, a 2-pentenyl group, and a 3-methyl-2-butenyl group.

The compounds of this invention are novel compounds and have an excellent antitussive activity. Also, the compounds of this invention have a lower toxicity, their safety margin is broader than those of d-3-methoxy-N-methylmorthinan (general name, dextromethorphan). In particular, the d-isomer of the compound of this invention does not form a physical dependence and hence the compound is particularly valuable as an antitussive agent.

The compound of this invention represented by the foresaid Formula I may be prepared by heating the isoquinoline derivative represented by the general Formula II

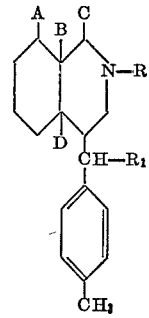

wherein R has the same significance as in the general Formula I, $R_1$ represents a hydrogen atom, a carbamoyl group, a cyano group or a carboxyl group which may have been esterified, and one of A, B, C and D represents a hydroxyl group and other three represent each a hydrogen atom or adjacent two of them form a double bond and other two represent each a hydrogen atom in the presence of an acid.

The aliphatic hydrocarbon residual group at the N-position of the compound of this invention represented by the general Formula I may be once released therefrom by a known method and then replaced by other aliphatic hydrocarbon residual group by a known method.

Examples of the isoquinoline derivatives represented by the general Formula II, which are used as the starting materials in this invention are 1-p-methylbenzyl-2-methyl-1,2,3,4,5,6,7,8 - octahydroisoquinoline,
1 - p - methylbenzyl - 2-allyl-1,2,3,4,5,6,7,8-octahydroisoquinoline,
1 - p - methylbenzyl-2-propyl-1,2,3,4,5,6,7,8-octahydroisoquinoline,
1-p-methylbenzyl-2-butenyl-1,2,3,4,5,6,7,8 - octahydroisoquinoline,
1-p - methylbenzyl-2 - ethyl-1,2,3,4,5,6,7,8-octahydroisoquinoline,
1-p-methylbenzyl-2-methyl-1,2,3,4,5,6,7,8,8a - octahydroisoquinoline,
1-p-methylbenzyl-2-methyl-1,2,3,4,5,6,7,8,8a - octahydroisoquinoline,
4a-hydroxyl-1-p-methylbenzyl-2-methyl - 1,2,3,4,4a,5,6,7, 8,8a-decahydroisoquinoline,
1-(α-carbamoyl-p-methylbenzyl)-2 - methyl - 1,2,3,4,5,6, 7,8-octahydroisoquinoline,
1-(α-cyano-p-methylbenzyl) - 2 - methyl - 1,2,3,4,5,6,7,8-octahydroisoquinoline, and
1-(α-ethoxycarbonyl-p-methylbenzyl)-2 - methyl - 1,2,3,4, 5,6,7,8-octahydroisoquinoline.

Each of the isoquinoline derivatives represented by the general Formula II and the compounds of this invention represented by the general Formula I may be the d-isomer, the l-isomer or a mixture of them.

For producing the Compound I of this invention, the starting material II is heated to, preferably, 100–150° C. for 20–100 hours in the presence of an acid. As the acid used in the reaction, there are such inorganic acids as phosphoric acid, polyphosphoric acid, hydrobromic acid, hydrochloric acid, sulfuric acid, and the like and such organic acids as formic acid, acetic acid, p-toluenesulfonic acid, and the like or mixtures of them. It is preferable to use such an acid in a highly concentrated state. The particularly preferable acid is 85% phosphoric acid. These acids may be used together with solvents but the presence of solvent is not always necessary.

The reaction product may be isolated from the reaction product liquid by adding, e.g., aqueous ammonia to the reaction product liquid to basify the reaction product and then extracting the base with ether. If necessary, the product may further be refined by recrystallization, column chromatography, etc.

The pharmacologically nontoxic acid-addition salts of the products prepared above may be obtained by treating the product with an inorganic acid such as hydrobromic acid, hydrochloric acid, and sulfuric acid or an organic acid such as acetic acid and tartaric acid according to an ordinary manner.

As an example, d-3-methyl-N-methylmorphinan hydrochloride which is one of the compounds of this invention and the known dextromethorphan hydrobromide were tested for their antitussive activity and toxicity by the following procedure and their safety margins were compared.

EXPERIMENT (1) Antitussive activity

According to the method of N. P. Sanzarl et al. (Journal Pharmacol. Exptl. Therap., 162, 190–195 (1968)), 50 μg./kg. of a ganglionic stimulant, 1,1-dimethyl-4-phenyl-piperadinium iodide was administered to a cat having a weight of 2.5–3.5 kg. by intravenous injection while measuring the pressure in trachea, whereby the pressure in trachea was greatly changed. Then, the test sample was administered to the cat after 5 minutes and further 1,1-dimethyl-4-phenylpiperadinium iodide was administered to the cat by intravenous injection after 10 minutes, thereafter, the number of coughs was measured from the change of the pressure in trachea. From the number of coughs the inhibition percent was calculated and further from the relation between the administered amount of the test sample and the inhibition percent, $ED_{50}$ (mg./kg.) was calculated.

(2) Toxicity

According to the Boehrens-Karber method (Arch. Exptl. Phathol. Pharmacol., 162, 482–483 (1931)), the test sample was administered to an ICR–JCL mouse having a weight of about 30 g. by subcutaneous injection, the mortality rate after 3 days was observed, and $LD_{50}$ (mg./kg.) was calculated from the relation between the administered amount of the test sample and the mortality rate.

These results are shown in the following table.

TABLE 1

| Test sample | $ED_{50}$ | $LD_{50}$ | Safety margin ($LD_{50}/ED_{50}$) |
|---|---|---|---|
| d-3-methyl-N-methylmorphinan hydrochloride | 1.0 | 185 | 185 |
| Dexstromethorphan hydrobromide | 1.6 | 150 | 94 |

As the results of testing d-3-methyl-N-methylmorphinan hydrochloride which is one of the compounds of this invention and codeine phosphate for the formation of physical dependence using rats, it was confirmed that in case of codeine phosphate the occurrence of abstinence syndromes such as the abnormal behavior, the reduction in weight, etc., was observed and the physical dependence was formed, while in the case of d-3-methyl-N-methylmorphinan hydrochloride the occurrence of abstinence syndromes was not observed and the physical dependence was not formed.

The compounds of this invention may be administered orally in the form of, e.g., tablet, capsule, powder, syrup, etc., or may be administered parenterally by intramuscular injection, subcutaneous injection, etc. The clinical doses in the case of oral administration is 30–150 mg. per day for adult, which is usually administered 3–4 times, while the doses in the case of parenteral administration is 5–15 mg. per day, which is administered in 1–2 times. The clinical doses is properly adjusted according to the conditions, the age, etc., of patient.

REFERENCE EXAMPLE 1

(a) To a suspension of 2.24 g. of a metallic magnesium in 36 ml. of an 1:1 mixture of tetrahydrofuran and ether was added dropwise a solution of 13.5 g. of p-methylbenzyl chloride in 36 ml. of an 1:1 mixture of tetrahydrofuran and ether over a period of about 30 minutes and then the resultant mixture was refluxed under heating for 30 minutes. The solution thus obtained was added dropwise to a suspension of 17.5 g. of 2-methyl-5,6,7,8-tetrahydroisoquinoline bromide in 90 ml. of an 1:1 mixture of tetrahydrofuran and ether cooled to 0° C. to ¡—5° C. over a period of about 25 minutes. After stirring the mixture for 2 hours at temperatures of from 0° C. to —5° C., 100 ml. of cooled ether and 1.7 normal ammonia were added to the reaction product liquid and after shaking sufficiently the system, the ether layer thus formed was recovered. After saturing the aqueous layer thus separated with ammonium chloride, the product in the aqueous layer was further extracted with 50 ml. of ether. The ether extract was combined with the ether layer recovered above and then the product in the mixture was extracted 4-times with 30 ml. each of 1 normal hydrochloric acid cooled. To the hydrochloric acid extract was added 100 ml. of cooled 1.7 normal ammonia, and the oily material formed was extracted thrice with 80 ml. each of ether.

After drying the ether extract over anhydrous potassium carbonate, ether was distilled away to provide 15.4 g. of oily 1-p-methylbenzyl-1,2,5,6,7,8-hexahydroisoquinoline.

(b) In a mixture of 300 ml. of methanol and 30 ml. of water were dissolved 15.4 g. of oily 1-p-methylbenzyl-2-methyl-1,2,5,6,7,8-hexahydroisoquinoline and while stirring the mixture, 2 g. of sodium borohydride was added little by little to the mixture at room temperature over a period of about 15 minutes. After stirring the light yellow solution obtained overnight at room temperature, the solvent was distilled away under a reduced pressure. The residue was mixed with 50 ml. of water and 150 ml. of ether and after sufficiently shaking the mixture, the ether layer formed was separated. The aqueous layer thus separated was adjusted to basicity by the addition of a small amount of 1.7 normal ammonia and then the product in the layer was extracted with 100 ml. of ether. The ether layer separated above was combined with the ether extract and after washing the mixture with 1.7 normal ammonia and water, the mixture was dried over anhydrous potassium carbonate and then ether was distilled away to provide 13.8 g. of an orange oily material. By subjecting the product to a distillation under a reduced pressure, oily 1-p-methylbenzyl-2-methyl-1,2,3,4,5,6,7,8-octahydroisoquinoline was obtained. Boiling point 133–136° C./0.35 mm. Hg. Mass spectrographic analysis: m/e: 255 (M+). Elementary analysis as $C_{18}H_{25}N$: Calculated (percent): C, 84.65; H, 9.87; N, 5.48. Found (percent): C, 84.21; H, 9.56; N, 6.02.

Then, 7 g. of the product obtained above and 4.15 g. of D-(+)-tartaric acid were dissolved in 40 ml. of methanol by heating and the solution was allowed to stand at room temperature, whereby prism-like crystals were precipitated, which were recovered by filtration. Thus, 5.55 g. of the crystals were obtained having a melting point of 190–192° C. and $[\alpha]_D^{20}=+41.9$ (c.=1.6, methanol). (The filtrate was called "mother liquor A.")

The crystals thus recovered were dissolved in 43 ml. of methanol under heating and the solution was allowed ot stand for 3 hours at room temperature, whereby crystals were precipitated. The crystals have a melting point of 190–192° C. and $[\alpha]_D^{20}=+41.8$ (c.=0.75, methanol).

The crystals were dissolved in 30 ml. of water and 25 ml. of 1.7 normal ammonium was added to the solution, whereby an oily material was precipitated. The oily material was extracted with 100 ml. of ether and after washing with water, the extract was dried over anhydrous sodium sulfate. Then, by distilling away ether from the extract, oily d-1-p-methylbenzyl-2-methyl-1,2,3,4,5,6,7,8-octahydroisoquinoline was quantitatively obtained. $[\alpha]_D^{20}=+33.3$ (c.=0.9, methanol).

Also, by concentrating the mother liquor A, an oily material of $[\alpha]_D^{20}=-12.6$ (c.=1, methanol) was obtained. When the oily material was dissolved in 40 ml. of acetone, the crystals thus precipitated were filtered away, and the filtrate obtained was concentrated, acicular crystals were precipitated. The crystal showed $[\alpha]_D^{20}=-13.2$ (c.=1, methanol) and the amount thereof were 6 g. When the crystals were dissolved in 30 ml. of water and 25 ml. of 1.7 normal ammonia was added to the solution, an oily material was precipitated.

The oily material was extracted with 100 ml. of ether and after washing with water, the extract was dried over anhydrous sodium sulfate and then ether was distilled away to provide quantitatively oily l-1-p-methylbenzyl-2-methyl - 1,2,3,4,5,6,7,8 - octahydroisoquinoline. $[\alpha]_D^{20}=-27.3$ (c.=1, methanol).

REFERENCE EXAMPLE 2

(a) When 0.2 g. of sodium amide was suspended in 4 ml. of water-free ether and then 1.03 g. of p-methylbenzyl cyanide was added dropwise to the suspension with stirring, an exothermic reaction occurred and the reaction product liquid became dark red. The reaction liquid was stirred further for 30 minutes at room temperature and then cooled to 3–4° C. by ice-water. To the liquid was added dropwise a solution of 0.7 g. of 1-chloro-5,6,7,8-tetrahydroisoquinoline in 5 ml. of water-free ether over a period of about 10 minutes and then the system was stirred for further 30 minutes and refluxed by heating for 7 hours. After the reaction was over, the reaction product liquid was dispersed in ice-water and after acidifying the dispersion with 3 normal aqueous hydrochloric acid solution and stirring, the aqueous layer formed was separated. The product in the remaining ether layer was further extracted three times each time with 3 ml. of 3 normal aqueous hydrochloric acid solution. The extract was combined with the aqueous layer separated above and the mixture was washed twice with 15 ml. each of ether. The aqueous layer was made alkaline with 3 normal aqueous ammonia and an oily material precipitated was extracted thrice with 30 ml. each of ether. The ether extract was washed with 20 ml. of aqueous saturated solution of sodium chloride and after drying the extract over anhydrous magnesium sulfate, the faint yellow ether solution obtained was concentrated under a reduced pressure to provide 0.9 g. of an orange-red oily material. The oily material was subjected to a distillation under a reduced pressure and after removing the initial fractions distilled at a temperature of 150° C. and a pressure of 0.4 mm. Hg, the bath temperature was raised to 170–180° C., whereby 0.45 g. of a viscous faint yellow oily material of dl-1-($\alpha$ - cyano-p-methylbenzyl)-5,6,7,8-tetrahydroisoquinoline distilled at 0.3–0.4 mm. Hg was obtained. Mass spectrographic analysis: m/e: 262 (M+). Elementary analysis as $C_{18}H_{18}N_2$: Calculated (percent): C, 82.40; H, 6.92; N, 10.68. Found (percent): C, 82.08; H, 6.81; N, 10.33.

(b) In 5 ml. of concentrated hydrochloric acid was dissolved 0.5 g. of dl-1-($\alpha$-cyano-p-methylbenzyl)-5,6,7,8-tetrahydroisoquinoline and after heating the solution to 70° C. for 30 hours, the solution was allowed to stand overnight at room temperature. The reaction product was mixed with 10 ml. of ice-water and after alkalifying the solution with concentrated aqueous ammonia, an oily material thus formed was extracted with 30 ml. of chloroform. After washing the chloroform extract with water and drying it over anhydrous magnesium sulfate, chloroform was distilled away under a reduced pressure to provide a crystalline solid. The product was finely suspended in ether and then recovered by filtration to provide 0.25 g. of dl-1-($\alpha$-carbamoyl-p-methylbenzyl)- 5,6,7,8-tetrahydroisoquinoline. Elementary analysis as $C_{18}H_{20}N_2O$: Calculated (percent): N, 9.99. Found (percent): N, 9.75.

(c) In 3 ml. of ethanol was dissolved 0.5 g. of dl-1-($\alpha$-carbamoyl-p-methylbenzyl) - 5,6,7,8 - tetrahydroisoquinoline and after adding 1 ml. of methyl iodide to the solution, the system was heated for 5 hours in a closed tube at 100° C.

After cooling the reaction product liquid, the liquid was concentrated under a reduced pressure. A red oily product thus obtained was washed well by adding ether and then ether was removed by decantation. The product (0.5 g.) was dissolved in a mixture of 10 ml. of methanol and 1 ml. of water and then 0.3 g. of sodium borohydride was added to the solution little by little. After allowing the liquid reaction product to stand overnight at room temperature, the reaction product liquid was concentrated under reduced pressure to remove methanol. The residue was mixed with 3 ml. of water and 20 ml. of chloroform followed by sufficient shaking. The chloroform layer thus formed was recovered and the aqueous layer was further extracted with 10 ml. of chloroform. The chloroform extract was combined with the chloroform layer recovered above and after washing the mixture with water, chloroform was distilled away to provide 0.4 g. of crude orange oily dl-1-($\alpha$-carbamoyl-p-methylbenzyl) - 2 - methyl-1,2,3,4,5,6,7,8-octahydroisoquinoline.

EXAMPLE 1

To 130 ml. of 85% phosphoric acid was added 26.5 g. of d-1-p-methylbenzyl - 2 - methyl - 1,2,3,4,5,6,7,8-octahydroisoquinoline and the mixture was heated to 130–140° C. for 72 hours. After the reaction was over, the reaction product liquid was dispersed in ice-water and the solution was made strongly alkaline by the addition of about 300 ml. of concentrated aqueous ammonia, whereby an oily material and a crystal were formed. The aqueous solution was mixed with 500 ml. of water and 500 ml. of ether followed by sufficient shaking; thereafter, the aqueous layer and the ether layer were separated. The aqueous layer was extracted with 500 ml. of ether and the extract was combined with the ether layer separated above. Black resinous material floating in the mixture was filtered away. After washing with water the ether solution thus obtained and drying over anhydrous potassium carbonate, 14 g. of a black-orange oily material was obtained. When the oily material was immediately distilled under a reduced pressure, 11 g. of a faint yellow transparent oily material showing a boiling point of 130–136° C./ 0.3 mm. Hg was obtained. The product was crystallized immediately after distillation. The crystals were recrystallized from 12 ml. of acetone, recovered by filtration, and washed with 7 ml. of acetone to provide 7.3 g. of the white prism crystal of d-3-methyl-N-methylmorphinan. Furthermore, from the filtrate in the recrystallization were recovered the same crystals. Melting point 90–93° C., $[\alpha]_D^{22}=+51.5$ (c.=1, methanol). Elementary analysis as $C_{18}H_{25}N$: Calculated (percent): C, 84.65; H, 9.87; N, 5.48. Found (percent): C, 84.88; H, 9.78; N, 5.69.

By treating the d-3-methyl-N-methylmorphinan thus obtained with hydrobromic acid in a conventional manner, the white acicular crystals of d-3-methyl-N-methylmorphinan hydrobromide were obtained. Melting point 213–216° C., $[\alpha]_D^{24}=+26.8$ (c.=1.13, methanol). Elementary analysis as $C_{18}H_{25}N \cdot HBr$: Calculated (percent): C, 64.28; H, 7.79; N, 4.16; Br, 23.76. Found (percent): C, 64.06; H, 7.83; N, 3.82; Br, 24.01.

By the similar procedures as above, the following phosphate, sulfate and tartrate salts of the above compound were obtained.

Phosphate

Melting point 267–269° C., $[\alpha]_D^{23}=+25.7$ (c.=0.5, methanol). Elementary analysis as $C_{18}H_{25}N \cdot H_3PO_4$:

Calculated (percent): C, 61.18; H, 7.99; N, 3.96. Found (percent): C, 61.01; H, 7.76; N, 4.03.

Sulfate

Melting point 209–211° C. (slightly melt at 198–200° C.), [α]$_D^{23}$= +26.9 (c.=0.4, methanol). Elementary analysis as $C_{18}H_{25}N \cdot H_2SO_4$: Calculated (percent): C, 61.16; H, 7.70; N, 3.96. Found (percent): C, 61.93; H, 7.78; N, 4.06.

Tartrate

Melting point 123–126° C., [α]$_D^{23}$= +35.1 (c.=0.4, methanol). Elementary analysis as

$$C_{18}H_{25}N \cdot C_4H_6O_6 \cdot \tfrac{1}{2}H_2O$$

Calculated (percent): C, 63.75; H, 7.78; N, 3.38. Found (percent): C, 63.71; H, 7.67; N, 3.33.

EXAMPLE 2

To 200 ml. of 85% phosphoric acid was added 25.5 g. of l-1-p-methylbenzyl-2-methyl-1,2,3,4,5,6,7,8-octahydro-isoquinoline and the resultant mixture was heated for 72 hours to 140–145° C. After the reaction was over, the reaction product liquid was treated as in Example 1 to provide 23.7 g. of an oily material. When the oily material was subjected to distillation under a reduced pressure, 19.8 g. of a faint yellow transparent oily material showing a boiling point of 139–142° C./0.12–0.15 mm. Hg was obtained. After distillation, the oily material was crystallized. By recrystallizing the crystal from 12 ml. of acetone and washing the crystal with a small amount of acetone, 11.4 g. of the white prism crystal of l-3-methyl-N-methylmorphinan was obtained. Melting point 89–93° C., [α]$_D^{22}$= —44.6 (c.=2, methanol). Elementary analysis as $C_{18}H_{25}N$: Calculated (percent): C, 84.65; H, 9.87; N, 5.48. Found (percent): C, 84.80; H, 9.84; N, 5.70.

EXAMPLE 3

By following the same procedure as Example 1 using 1.5 g. of dl-1-p-methylbenzyl-2-methyl-1,2,3,4,5,6,7,8-octahydroisoquinoline, 0.6 g. of oily dl-3-methyl-N-methylmorphinan was obtained. When the oily material was allowed to stand overnight, it was crystallized. Boiling point 125° C./0.55 mm. Hg to 130° C./0.6 mm. Hg. Melting point 53–56° C. Elementary analysis as $C_{18}H_{25}N$: Calculated (percent): C, 84.65; H, 9.87; N, 5.48. Found (percent): C, 84.11; H, 10.14; N, 5.62.

EXAMPLE 4

To 3 ml. of 85% phosphoric acid was added 0.4 g. of dl - 1 - (α-carbamoyl-p-methylbenzyl)-2-methyl-1,2,3,4,5, 6,7,8-octahydroisoquinoline and the mixture was heated for 72 hours to 135–145° C. After the reaction was over, the reaction product liquid was dispersed in 10 ml. of ice-water, the dispersion was made alkaline with concentrated aqueous ammonia, and the precipitates thus formed were extracted thrice with 20 ml. each of ether.

When the ether extract was washed with 20 ml. of aqueous saturated solution of ammonium chloride and then ether was distilled away under a reduced pressure, 0.4 g. of a red-orange oily material was obtained. The oily material was subjected to a column chromatography (1 cm. x 6 cm., elute methanol) using a column containing silica gel of 100–200 mesh and then the eluate from the column was condensed under a reduced pressure to provide 0.2 g. of an orange oily material.

By subjecting the oily material to distillation under a reduced pressure, 0.1 g. of oily dl-3-methyl-N-methylmorphinan was obtained. When the oily material was distilled and then allowed to stand overnight at room temperature, prism-form crystals were obtained. Boiling point 125–130° C./0.6 mm. Hg. Melting point 55–57° C.

By treating similarly d-1-(α-carbamoyl-p-methylbenzyl) - 2 - methyl-1,2,3,4,5,6,7,8-octahydroisoquinoline, d-3-methyl-N-methylmorphinan was obtained. Boiling point 130–136° C./0.3 mm. Hg. Melting point 90–93° C., [α]$_D^{20}$= +52.0 (c.=1, methanol).

EXAMPLE 5

To 3 ml. of 85% phosphoric acid was added 0.6 g. of dl-4a-hydroxy-2-methyl-1-p-methylbenzyl-1,2,3,4,4a,5, 6,7,8,8a-decahydroisoquinoline and the mixture was heated for 70 hours to 140–150° C. By treating the reaction product liquid as in Example 1, 0.2 g. of the prism-form crystals of dl-3-methyl-N-methylmorphinan was obtained. The infra-red absorption spectra and the nuclear magnetic resonance spectra of the product were the same as those of the product obtained in Example 1 and when the product was melted together with the product in Example 1, no melting point depression was observed. Melting point 54–56° C.

EXAMPLE 6

To 3 ml. of 85% phosphoric acid was added 0.6 g. of dl-2-methyl-1-p-methylbenzyl-1,2,3,4,6,7,8,8a-octahydroisoquinoline and the mixture was heated for 70 hours to 140–150° C. By treating the reaction product liquid as in Example 1, the prism-form crystals of dl-3-methyl-N-methylmorphinan was obtained.

EXAMPLE 7

To 3 ml. of 85% phosphoric acid was added 0.6 g. of dl-2-methyl-1-p-methylbenzyl-1,2,3,5,6,7,8,8a-octahydroisoquinoline and the mixture was heated for 70 hours to 140–150° C. By treating the reaction product liquid as in Example 1, the prism-form crystals of dl-3-methyl-N-methylmorphinan was obtained.

EXAMPLE 8

(a) In 10 ml. of chloroform was dissolved 3.7 g. of l-3-methyl-N-methylmorphinan and after adding 2 g. of the crystals of cyano bromide to the solution, the mixture was refluxed for 2 hours under heating. After the reaction was over, chloroform and unreacted cyano bromide were distilled away under a reduced pressure to provide an oily material. The oily product was mixed with 20 ml. of ether and 5 ml. of water and after shaking the mixture well, the ether layer thus formed was recovered. After washing the ether layer with 10 ml. of 1 normal hydrochloric acid and water and drying it over anhydrous magnesium sulfate, ether was distilled away. When petroleum ether was added to the residue, the product was crystallized. By recovering the crystal by filtration, 2.7 g. of the acicular crystals of l-N-cyano-3-methylmorphinan were obtained. Melting point 127–129° C.

IR γ$_{max.}^{KBr.}$ cm.$^{-1}$: 2200 (C≡N)

Elementary analysis as $C_{18}H_{22}N_2$: Calculated (percent): C, 81.16; H, 8.32; N, 10.52. Found (percent): C, 80.77; H, 8.19; N, 10.54.

(b) To 250 ml. of 6 normal hydrochloric acid was added 10 g. of l-N-cyano-3-methylmorphinan and the mixture was refluxed for 10 hours. After the reaction was over, the reaction product liquid was cooled, washed with 30 ml. of ether, the pH of the liquid was adjusted to 10–11 with concentrated aqueous ammonia, and then the product was extracted with 50 ml. of ether and further 20 ml. of ether. By drying the extract over anhydrous magnesium sulfate and distilling away the ether, 9.7 g. of an oily material was obtained. When the oily material was subjected to distillation under a reduced pressure, 7.2 g. of faint yellow and oily 3-methylmorphinan. The product had a slight hydroscopic property. Boiling point 148–155° C./1.3–1.5 mm. Hg. Elementary analysis as $C_{17}H_{23}N$: Calculated (percent): C, 84.59; H, 9.60; N, 5.80. Found (percent): C, 84.22; H, 8.90; N, 5.88.

(c)–1. A mixture of 2.41 g. of l-3-methylmorphinan, 60 ml. of dimethylformamide, 0.9 g. of sodium bicarbonate, and 1.57 g. of 1-bromo-3-methyl-2-butene was refluxed for 2 hours at 153–155° C. After the reaction was over, the reaction product liquid was cooled to room temperature and after filtering away inorganic matters thus formed, dimethylformamide was distilled away under a reduced pressure. The residue was mixed with 20 ml. of ether, 10 ml. of water, and 20 ml. of 1 normal hydrochloric acid, the mixture was shaken well, and then the aqueous layer thus formed was recovered. The pH of the aqueous layer was adjusted to 10–11 by concentrated aqueous ammonia and an oily material formed was extracted with 30 ml. of ether. The extract was washed with water, and after drying over anhydrous magnesium sulfate, ether was distilled away from the extract to provide 2.5 g. of an oily material. The oily material was dissolved in 20 ml. of saturated methanol solution of hydrogen chloride and the solution was concentrated under a reduced pressure. By crystallizing the oily material in ethyl acetate, 1.65 g. of acicular crystals were obtained. When the crystals were recrystallized from a 40:1 mixed solvent of acetone and methanol, 0.9 g. of the acicular crystals of sublimative l-N-(3-methyl-2-butenyl)-3-methylmorphinan hydrochloride was obtained. Melting point 227–228° C. (in closed tube). $[\alpha]_D^{23}=$ —65.6 (c.=1, methanol). Elementary analysis as $C_{22}H_{31}N \cdot HCl$: Calculated (percent): C, 76.38; H, 9.32; N, 4.05; Cl, 10.25. Found (percent): C, 76.38; H, 9.38; N, 3.96; Cl, 10.41.

(c)–2. A mixture of 2.41 g. of l-3-methylmorphinan, 60 ml. of dimethylformamide, 0.9 g. of sodium bicarbonate, and 1.2 g. of 3-bromo-1-propene was refluxed for 5 hours under heating.

After the reaction was over, the reaction product liquid was cooled to room temperature and after filtering away inorganic matters precipitated, dimethylformamide was distilled away under a reduced pressure. Then, the residue obtained was mixed with 20 ml. of ether, 10 ml. of water, and 20 ml. of 1 normal hydrochloric acid and after shaking the mixture well, the aqueous layer formed was separated. The pH of the aqueous layer was adjusted to 10–11 with concentrated aqueous ammonia and the oily material formed was extracted with 30 ml. of ether. The extract was washed with water and after drying it over anhydrous magnesium sulfate, either was distilled away to provide 3 g. of an oily material. The oily material was dissolved in 2 ml. of concentrated hydrochloric acid and excessive hydrochloric acid was distilled away under a reduced pressure. To the residue were added 5 ml. of ethyl acetate and a few drops of acetone to crystallize the product, whereby 2.3 g. of the crude crystals of l-N-allyl-3-methylmorphinan hydrochloride was obtained.

The crystals were dissolved in 50 ml. of a 20:1 mixture of acetone and methanol under heating and activated carbon was added to the solution followed by filtration. When the filtrate was allowed to stand overnight in a cold room, crystals were formed. By recovering the crystal by filtration, 1.5 g. of the sublimative acicular crystals of l-N-allyl-3-methylmorphinan hydrochloride was obtained. Melting point 236–239° C. (in closed tube). $[\alpha]_D^{23}=$ —53.6 (c.=1, methanol). Elementary analysis as $C_{20}H_{27}N \cdot HCl \cdot \frac{1}{3}CH_3COCH_3$: Calculated (percent): C, 73.86; H, 9.30; N, 4.31; Cl, 10.90. Found (percent): C, 74.05; H, 8.93; N, 4.31; Cl, 10.77.

EXAMPLE 9 (INJECTION)

In a physiological saline solution was dissolved d-3-methyl-N-methylmorphinan phosphate to provide an injection containing 5 mg./ml. of d-3-methyl-N-methylmorphinan phosphate and the injection was divided into 1 ml. each of an ampoule.

EXAMPLE 10 (TABLET)

| Formula: | Grams per 100 tablets |
|---|---|
| d-3-methyl-N-methylmorphinan phosphate | 1.0 |
| Lactose | 10 |
| Starch | 3.5 |
| Talc | 0.5 |

This formation could make 100 tablets. The tablets were formed on a 7.0 mm. flat punch and the tablets may be coated if desired.

What is claimed is:

1. A compound of the formula

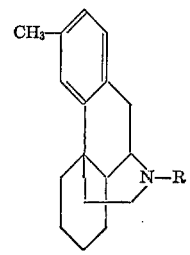

wherein R is an alkyl group having 1–5 carbon atoms, and pharmaceutically acceptable acid-addition salts thereof.

2. A compound according to claim 1 which is d-3-methyl-N-methylmorphinan and pharmaceutically acceptable acid addition salts thereof.

3. A compound according to claim 2 wherein the pharmaceutically acceptable acid addition salt is d-3-methyl-N-methylmorphinan phosphate.

4. A compound according to claim 2 wherein the pharmaceutically acceptable acid addition salt is selected from the group consisting of d-3-methyl-N-methylmorphinan bromide, d-3-methyl-N-methylmorphinan sulfate and d-3-methyl-N-methylmorphinan tartrate.

5. A compound according to claim 1 which is dl-3-methylmorphinan and pharmaceutically acceptable acid addition salts thereof.

6. A compound according to claim 1 which is l-3-methyl-N-methylmorphinan and pharmaceutically acceptable acid addition salts thereof.

References Cited

UNITED STATES PATENTS

| 2,746,962 | 5/1956 | Schnider | 260—285 |
| 3,166,560 | 1/1965 | Sawa et al. | 260—285 |
| 3,236,851 | 2/1966 | Sawa et al. | 260—285 |

DONALD G. DAUS, Primary Examiner

U.S. Cl. X.R.

260—283 R, 283 CN, 287 R; 424—260

UNITED STATES PATENT OFFICE
CERTIFICATE OF CORRECTION

Patent No. 3,786,054      Dated Jan. 15, 1974

Inventor(s) Masuo Murakami, et al

It is certified that error appears in the above-identified patent and that said Letters Patent are hereby corrected as shown below:

Column 2, lines 3-15:   replace " 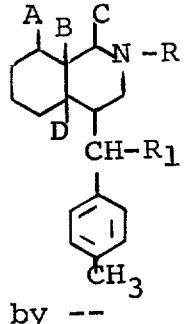

by -- 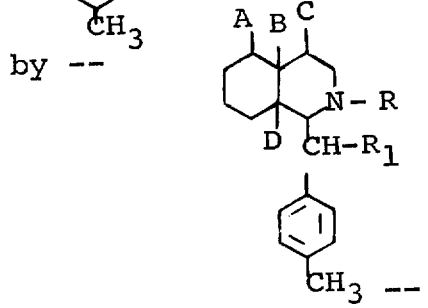 --

Column 2, line 44:   cancel "5"
         line 46:   cancel "4"

Column 3, line 40:   replace "Boehrens-Karber" by
                     ---Boehrens-Kärber---

Column 4, line 68:   replace "ot" by ---to---

Column 8, line 51:   replace "(C=N)" by ---(C≡N)---

Signed and sealed this 17th day of September 1974.

(SEAL)
Attest:

McCOY M. GIBSON JR.
Attesting Officer

C. MARSHALL DANN
Commissioner of Patents